(12) United States Patent
Fuks et al.

(10) Patent No.: US 7,906,996 B1
(45) Date of Patent: Mar. 15, 2011

(54) SYSTEM AND METHOD FOR CONTROLLING AN INTEGRATED CIRCUIT IN DIFFERENT OPERATIONAL MODES

(75) Inventors: Adam Fuks, Mountain View, CA (US); Philip Cupryk, Camas, WA (US); Soong Boon Tong, Daly City, CA (US)

(73) Assignee: NXP B.V., Eindhoven (NL)

( * ) Notice: Subject to any disclaimer, the term of this patent is extended or adjusted under 35 U.S.C. 154(b) by 35 days.

(21) Appl. No.: 12/543,467

(22) Filed: Aug. 18, 2009

(51) Int. Cl.
*H03L 7/00* (2006.01)

(52) U.S. Cl. .......................................... 327/142; 327/544

(58) Field of Classification Search .................. 327/141, 327/142, 143, 544
See application file for complete search history.

(56) References Cited

U.S. PATENT DOCUMENTS

| | | | | |
|---|---|---|---|---|
| 5,452,401 A | * | 9/1995 | Lin | 713/322 |
| 6,647,502 B1 | * | 11/2003 | Ohmori | 713/322 |
| 7,814,344 B2 | * | 10/2010 | Li | 713/300 |

* cited by examiner

*Primary Examiner* — Jeffrey S Zweizig

(57) ABSTRACT

A system and method for controlling an IC in different operational modes involves automatically loading operational configurations of target circuitries in the IC for a determined operational mode into at least one register and operating the target circuitries in the IC according to the operational configurations that are automatically loaded into the at least one register.

20 Claims, 10 Drawing Sheets

SYSTEM AND METHOD FOR CONTROLLING AN INTEGRATED CIRCUIT IN DIFFERENT OPERATIONAL MODES

Embodiments of the invention relate generally to integrated circuit (IC) systems and, more particularly, to a system and method for controlling an IC in different operational modes.

In an IC, unused circuitries can be shut down to conserve energy and restarted when needed. However, due to the vast amount of possible combinations of which circuitries should be shut down or restarted, a user usually cannot shut down or restart desired circuitries in the IC. Therefore, there is a need to provide a system and method for controlling the IC such that the user can control the operation of every target circuitry in the IC.

A system and method for controlling an IC in different operational modes involves automatically loading operational configurations of target circuitries in the IC for a determined operational mode into at least one register and operating the target circuitries in the IC according to the operational configurations that are automatically loaded into the at least one register.

In an embodiment, a method for controlling an integrated circuit (IC) in different operational modes includes obtaining operational configurations of circuitries in the IC for each operational mode of the different operational modes, determining an operational mode for the IC from the different operational modes, automatically loading the operational configurations of the circuitries in the IC for the determined operational mode into at least one register and operating the IC in the determined operational mode, including operating the circuitries in the IC according to the operational configurations that are automatically loaded into the at least one register.

In an embodiment, a system for controlling an integrated circuit (IC) in different operational modes includes an IC operational configuration obtainer circuit, an IC operational mode determiner circuit, at least one IC operational configuration register and an IC operational configuration loader circuit. The IC operational configuration obtainer circuit is configured to obtain operational configurations of circuitries in the IC for each operational mode of the different operational modes. The IC operational mode determiner circuit is configured to determine an operational mode for the IC from the different operational modes. The IC operational configuration loader circuit is configured to automatically load the operational configurations of the circuitries in the IC for the determined operational mode into the at least one IC operational configuration register. The at least one IC operational configuration register controls the circuitries in the IC to operate according to the operational configurations that are automatically loaded into the at least one IC operational configuration register.

In an embodiment, a system on chip (SoC) operating in different operational modes includes circuitries and an SoC operational mode controller circuit. The SoC operational mode controller circuit includes an SoC operational configuration obtainer circuit, an SoC operational mode determiner circuit, at least one SoC operational configuration register and an SoC operational configuration loader circuit. The SoC operational configuration obtainer circuit is configured to obtain operational configurations of the circuitries for each operational mode of the different operational modes. The SoC operational mode determiner circuit is configured to determine an operational mode for the SoC from the different operational modes. The SoC operational configuration loader circuit is configured to automatically load the operational configurations of the circuitries for the determined operational mode into the at least one SoC operational configuration register. The at least one SoC operational configuration register controls the circuitries to operate according to the operational configurations that are automatically loaded into the at least one SoC operational configuration register.

Other aspects and advantages of embodiments of the present invention will become apparent from the following detailed description, taken in conjunction with the accompanying drawings, illustrated by way of example of the principles of the invention.

Throughout the description, similar reference numbers may be used to identify similar elements.

Figure 1:
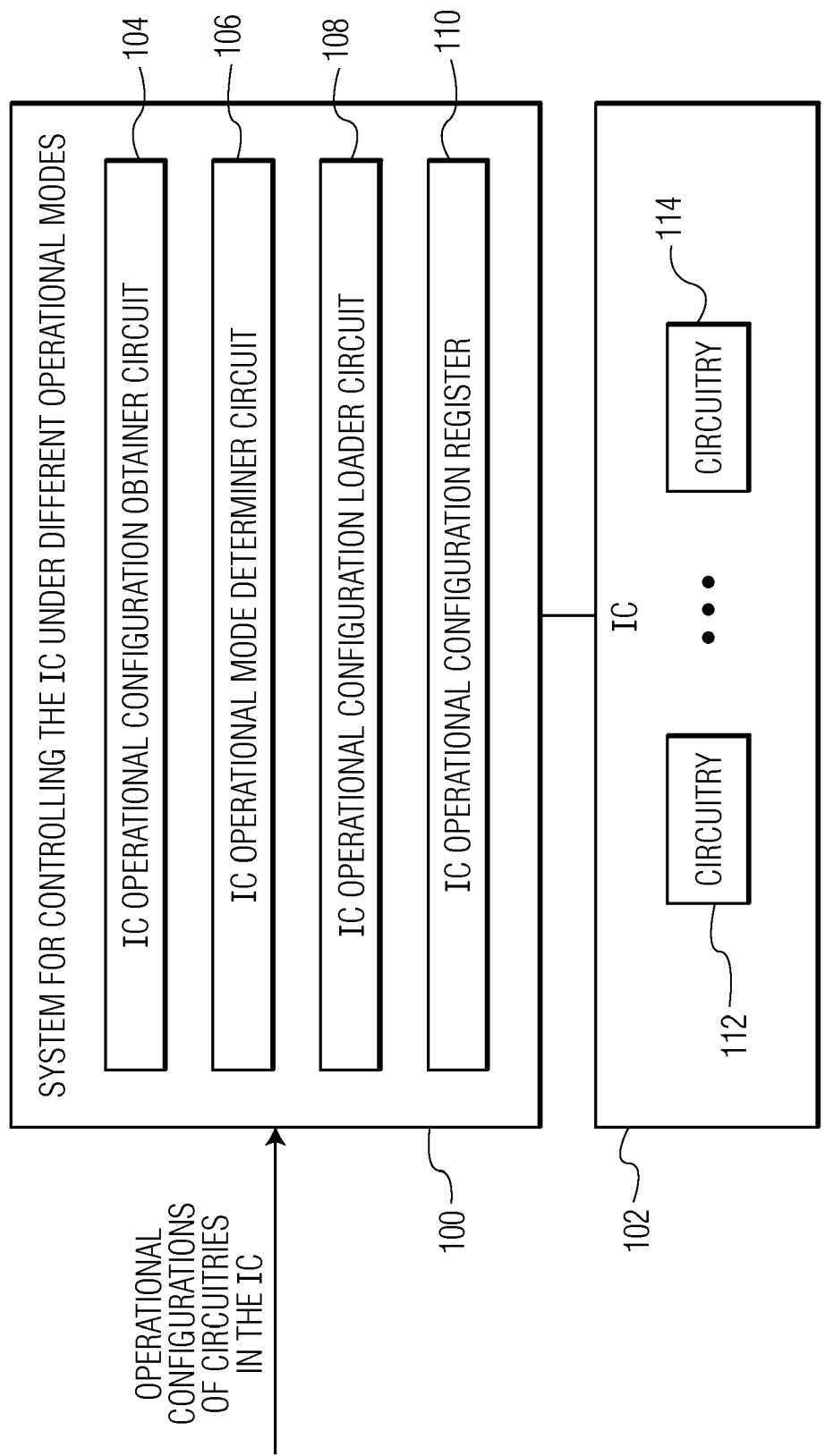
FIG. 1 is a schematic block diagram of a system for controlling an IC in different operational modes in accordance with an embodiment of the invention.

FIG. 1 is a schematic block diagram of a system 100 for controlling an IC 102 in different operational modes in accordance with an embodiment of the invention. As shown in FIG. 1, the system includes an IC operational configuration obtainer circuit 104, an IC operational mode determiner circuit 106, an IC operational configuration loader circuit 108 and an IC operational configuration register 110. The system controls the operations of the IC in the different operational modes.

The IC 102 includes at least two target circuitries 112, 114 that are controlled by the system 100 of FIG. 1. The target circuitries may include at least one digital circuitry and/or at least one analog circuitry. For example, the circuitries include at least one clock circuit (not shown) of the IC. The IC may include more circuitries than the number of target circuitries that are controlled by the system of FIG. 1. For example, the IC includes sixteen circuitries and eight circuitries out of the sixteen circuitries are chosen as the target circuitries that are controlled by the system of FIG. 1.

In the embodiment of FIG. 1, the IC operational configuration obtainer circuit 104 is configured to obtain operational configurations of the target circuitries 112, 114 in the IC 102 for each operational mode of the different operational modes. In an embodiment, the operational configurations of the target circuitries include power consumption configurations of the target circuitries.

The IC operational mode determiner circuit 106 is configured to determine an operational mode for the IC 102 from the different operational modes. In an embodiment, the IC operational mode determiner circuit processes a request to switch the IC from operating in a first operational mode to operating in a second operational mode, verifies whether a current operational mode of the IC is the first operational mode, and determines a next operational mode of the IC to be the second operational mode using at least one processor.

The IC operational configuration loader circuit 108 is configured to automatically load the operational configurations of the target circuitries 112, 114 in the IC 102 for the determined operational mode into the IC operational configuration register 110.

The IC operational configuration register 110 is configured to store the operational configurations of the target circuitries 112, 114, in the IC 102 for the determined operational mode that are automatically loaded into the IC operational configuration register by the IC operational configuration loader circuit 108. In an embodiment, the IC operational configuration register is further configured to control the operations of the circuitries according to the operational configurations that are automatically loaded into the IC operational configuration register. In response to the operational configurations loaded into the IC operational configuration register, the IC operates in the determined operational mode, where the target circuitries in the IC operate according to the operational configurations that are automatically loaded into the IC operational configuration register. Although the system 100 of FIG. 1 includes one IC operational configuration register, the system may include more than one IC operational configuration register in other embodiments.

Figure 2:
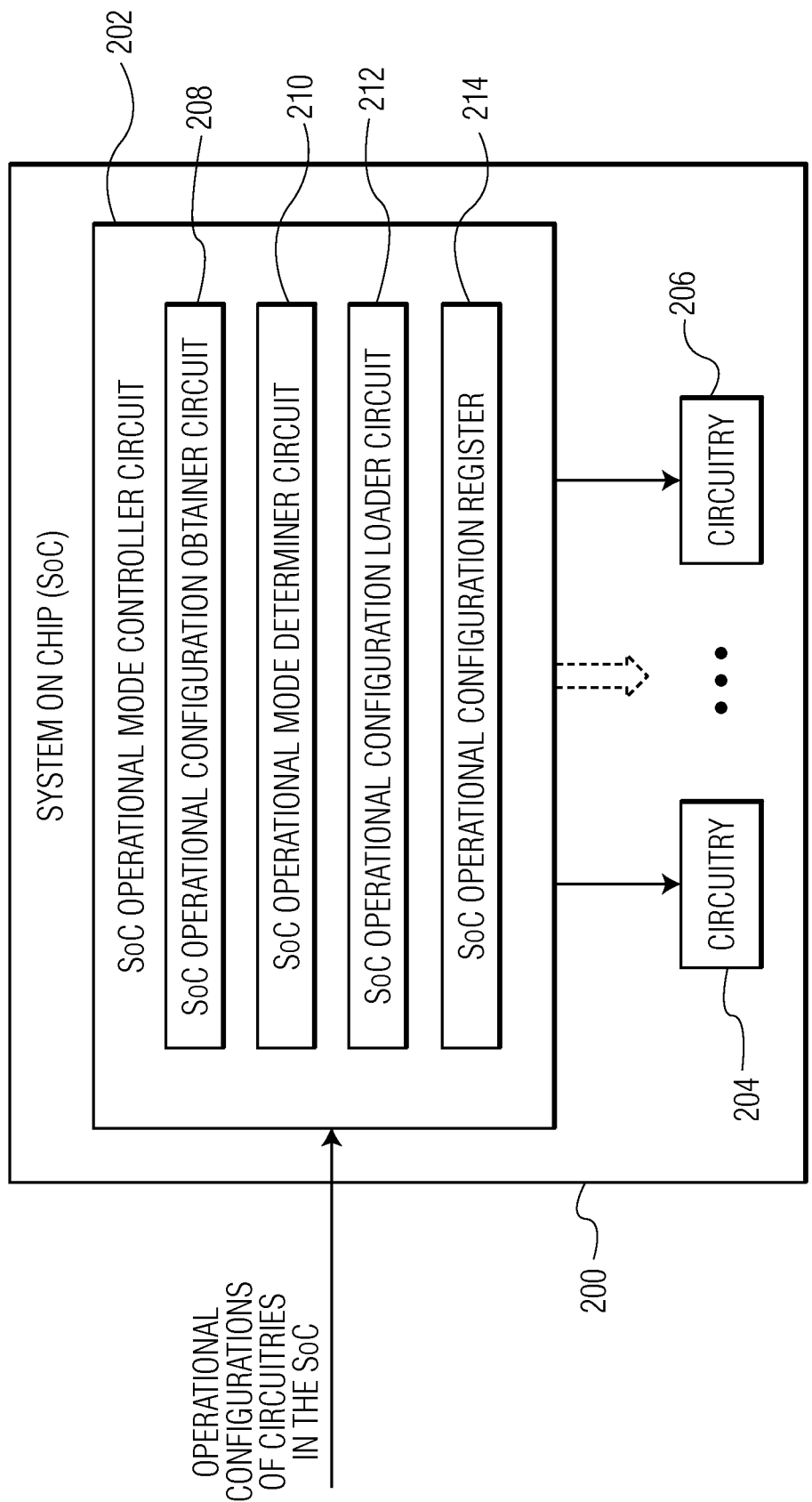
FIG. 2 depicts a system on chip (SoC) in accordance with an embodiment of the invention.

Although the system 100 in the embodiment of FIG. 1 is shown as being separate from the IC 102, the system may be integrated within the IC in other embodiments. For example, FIG. 2 depicts an SoC 200 in accordance with an embodiment of the invention. As shown in FIG. 2, the SoC includes an SoC operational mode controller circuit 202 and at least two target circuitries 204, 206 that are controlled by the SoC operational mode controller circuit. The SoC operational mode controller circuit includes an SoC operational configuration obtainer circuit 208, an SoC operational mode determiner circuit 210, an SoC operational configuration loader circuit 212 and an SoC operational configuration register 214. The SoC operational mode controller circuit controls the operations of the target circuitries in different operational modes. The target circuitries may include at least one digital circuitry and/or at least one analog circuitry. For example, the circuitries include at least clock circuit (not shown) of the SoC. The SoC may include more circuitries than the number of the target circuitries that are controlled by the SoC operational mode controller circuit. For example, the SoC includes sixteen circuitries and eight circuitries out of the sixteen circuitries are chosen as the target circuitries that are controlled by the SoC operational mode controller circuit.

In the embodiment of FIG. 2, the SoC operational configuration obtainer circuit 208 is configured to obtain operational configurations of the target circuitries 204, 206 for each operational mode of the different operational modes. In an embodiment, operational configurations of the target circuitries include power consumption configurations of the target circuitries.

The SoC operational mode determiner circuit 210 is configured to determine an operational mode for the SoC 200 from the different operational modes. In an embodiment, the SoC operational mode determiner circuit processes a request to switch the SoC from operating in a first operational mode to operating in a second operational mode, verifies whether a current operational mode of the SoC is the first operational mode, and determines a next operational mode of the SoC to be the second operational mode using at least one processor.

The SoC operational configuration loader circuit 212 is configured to automatically load the operational configurations of the target circuitries 204, 206 in the SoC 200 for the determined operational mode into the SoC operational configuration register 214.

The SoC operational configuration register 214 is configured to store the operational configurations of the target circuitries 204, 206 in the SoC 200 in the determined operational mode that are automatically loaded into the SoC operational configuration register by the SoC operational configuration loader circuit 212. The SoC operational configuration register is further configured to control the operations of the target circuitries in the SoC according to the operational configurations that are automatically loaded into the SoC operational configuration register. In response to the operational configurations loaded into the SoC operational configuration register, the SoC operates in the determined operational mode, where the target circuitries in the SoC operate according to the operational configurations that are automatically loaded into the at least one register. Although the SoC operational mode controller circuit in the embodiment of FIG. 2 includes one SoC operational configuration register, the SoC operational mode controller circuit may include more than one SoC operational configuration registers in other embodiments.

Figure 3:
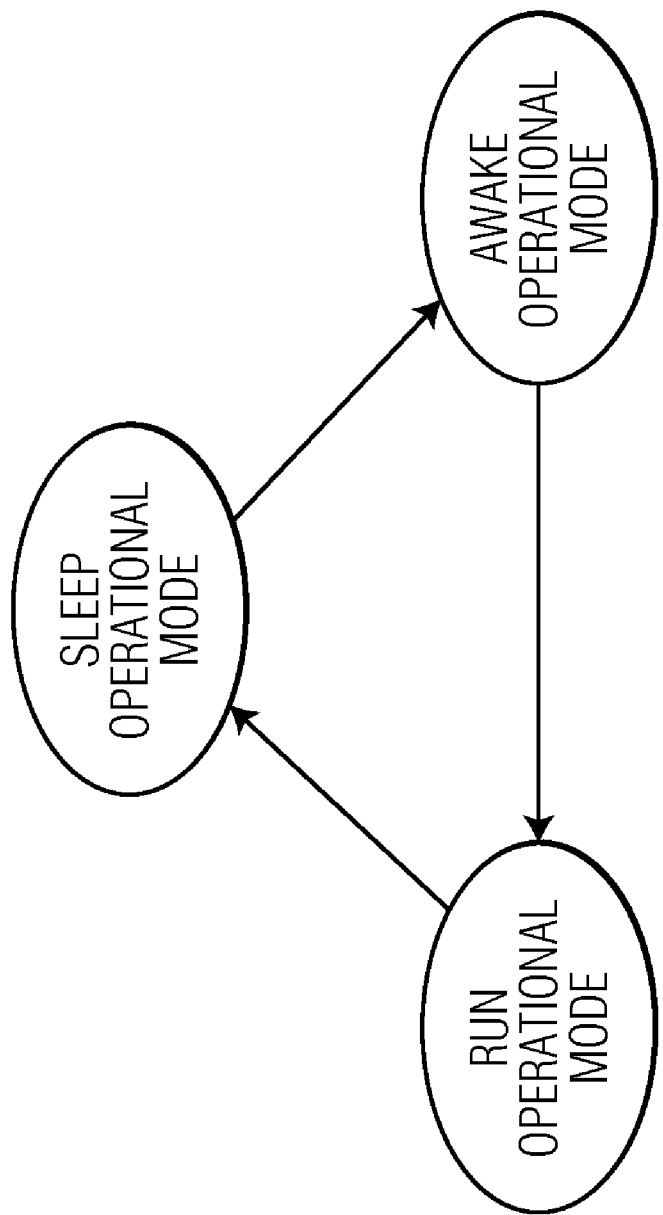
FIG. 3 illustrates three exemplary operational modes that can be used in the system described in reference to FIG. 1 and the SoC described with reference to FIG. 2.

FIG. 3 illustrates three exemplary operational modes that can be used in the system 100 shown in FIG. 1 and the SoC 200 shown in FIG. 2. As shown in FIG. 3, the three different operational modes consist of a run operational mode, a sleep operational mode and an awake operational mode.

The power consumption of an IC usually increases when the performance of the IC increases. When lesser performance of the IC is required, unused components of the IC can be shut down to conserve energy. In the run operational mode, the IC runs at least one external application. In the sleep operational mode, at least one component of the IC is shut down to conserve energy. In the awake operational mode, at least a part of the component of the IC that is shut down to conserve the energy in the sleep operational mode wakes up from being shut down. In an embodiment, the IC does not execute any external application in the sleep operational mode and in the awake operational mode.

After an analog circuitry is shut down to conserve energy, restarting the analog circuitry can take a relatively long time. Thus, although shutting down all unused analog circuitries can result in a large saving of power consumption, restarting all unused analog circuitries can take a long time and may not be fit for time critical operations of the IC. In an embodiment, in the sleep operational mode, only selected one or more analog circuitries of all unused analog circuitries, which need not wake up quickly, are shut down.

As illustrated in FIG. 3, an IC operates in the run operational mode after operating in the awake operational mode, operates in the sleep operational mode after operating in the run operational mode and operates in the awake operational mode after operating in the sleep operational mode. In other words, after operating in the awake operational mode, the IC cannot operate in the sleep operational mode without operating in the run operational mode first. After operating in the run operational mode, the IC cannot operate in the awake operational mode without operating in the sleep operational mode first. After operating in the sleep operational mode, the IC cannot operate in the run operational mode without operating in the awake operational mode first.

Figure 4:
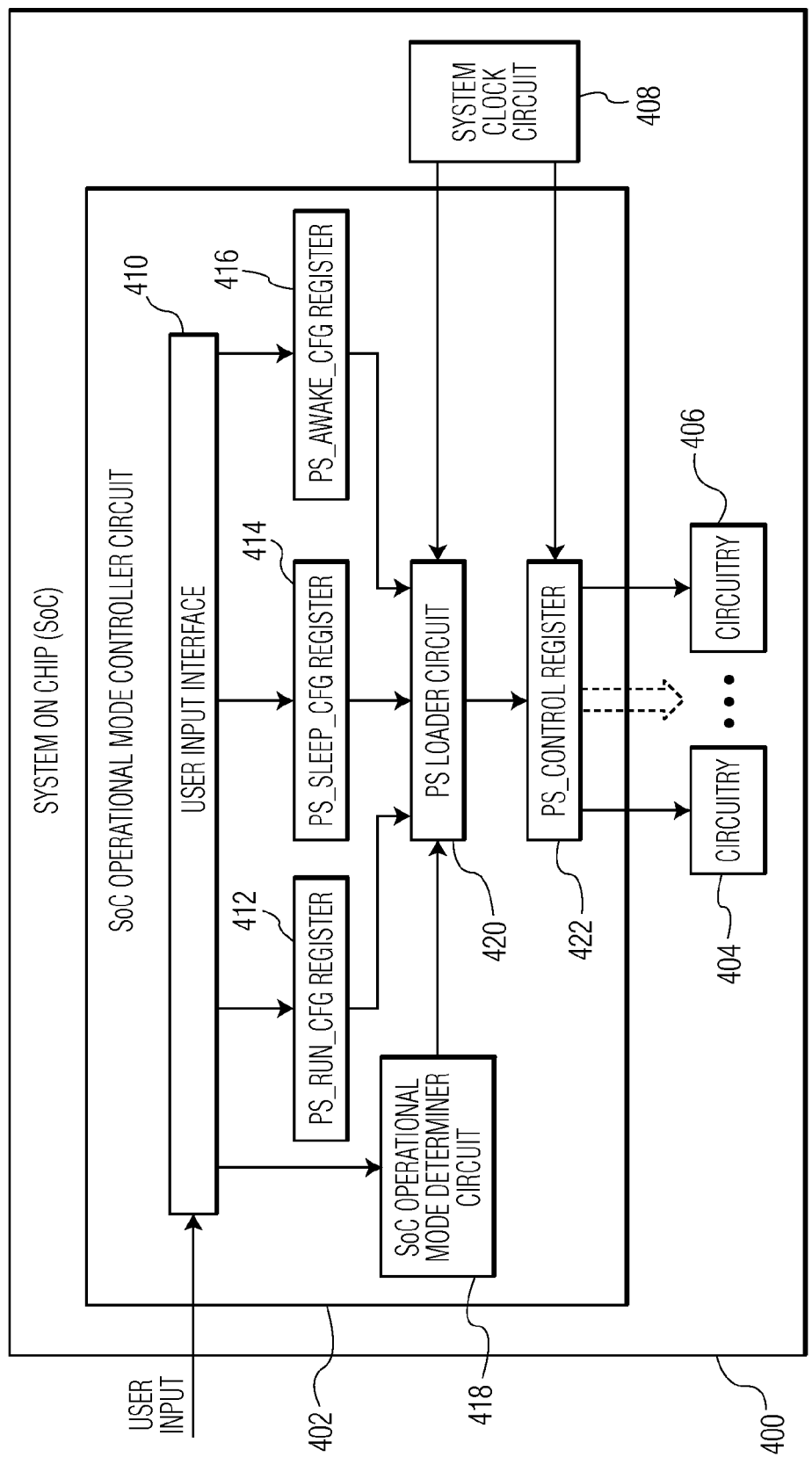
FIG. 4 depicts another SoC in accordance with an embodiment of the invention.

FIG. 4 depicts another SoC 400 in accordance with an embodiment of the invention. The SoC of FIG. 4 uses the three operational modes described with reference to FIG. 3. As shown in FIG. 4, the SoC includes an SoC operational mode controller circuit 402, at least two target circuitries 404, 406 that are controlled by the SoC operational mode controller circuit, and a system clock circuit 408. The target circuitries may include at least one digital circuitry and/or at least one analog circuitry. The SoC may include more circuitries than the number of the target circuitries that are controlled by the SoC operational mode controller circuit. For example, the SoC includes sixteen circuitries and eight circuitries out of the sixteen circuitries are chosen as the target circuitries that are controlled by the SoC operational mode controller circuit. Although the SoC of FIG. 4 includes one system clock circuit, the SoC may include more than one system clock circuits in other embodiments.

In the embodiment of FIG. 4, the SoC operational mode controller circuit 402 includes an optional user input interface 410, a power state configuration register 412 for the run operational mode of FIG. 3 that is also referred to as the "PS_RUN_CFG" register, a power state configuration register 414 for the sleep operational mode of FIG. 3 that is also referred to as the "PS_SLEEP_CFG" register, a power state configuration register 416 for the awake operational mode of FIG. 3 that is also referred to as the "PS_AWAKE_CFG" register, an SoC operational mode determiner circuit 418, an SoC power state loader circuit 420 that is also referred to as the "PS" loader circuit and an SoC power state control register 422 that is also referred to as the "PS_CONTROL" register.

The optional user input interface 410 is configured to receive power consumption configurations of the target circuitries 404, 406 for the three operational modes of FIG. 3 from at least one user, which can be a person or a machine that is internal or external to the SoC 400, and to output received power consumption configurations of the target circuitries for the three operational modes of FIG. 3 to the PS_RUN_CFG register 412, the PS_SLEEP_CFG register 414 and/or the PS_AWAKE_CFG register 416, respectively. In other words, the optional user input interface allows at least one user to program the PS_RUN_CFG register, the PS_SLEEP_CFG register and the PS_AWAKE_CFG register, either individually or jointly. In an embodiment, the user continuously programs the PS_RUN_CFG register when the SoC 400 operates in the run operational mode, programs the PS_SLEEP_CFG register only before the SoC operates in the sleep operational mode and programs the PS_AWAKE_CFG register only before the SoC operates in the awake operational mode.

The user input interface 410 is optional. In an embodiment, the user directly programs the PS_RUN_CFG register 412, the PS_SLEEP_CFG register 414 and the PS_AWAKE_CFG register 416. In another embodiment, default values of the power states of the target circuitries 404, 406 are stored in the PS_RUN_CFG register, the PS_SLEEP_CFG register and the PS_AWAKE_CFG register without any user input.

The PS_RUN_CFG register 412 is configured to store power consumption configurations of the target circuitries 404, 406 in the SoC 400 for the run operational mode. The power consumption configurations that are stored in the PS_RUN_CFG register can be used by the SoC as soon as the PS_RUN_CFG register is programmed by the user.

The PS_SLEEP_CFG register 414 is configured to store power consumption configurations of the target circuitries 404, 406 in the SoC 400 for the sleep operational mode. The power consumption configurations that are stored in the PS_SLEEP_CFG register can be used by the SoC only when the SoC begins to operate in the sleep operational mode.

The PS_AWAKE_CFG register 416 is configured to store power consumption configurations of the target circuitries 404, 406 in the SoC 400 for the awake operational mode. The power consumption configurations that are stored in the PS_AWAKE_CFG register can be used by the SoC only when the SoC begins to operate in the awake operational mode.

The power consumption configurations of the target circuitries 404, 406 that are stored in the PS_RUN_CFG register 412 include a power consumption configuration of each of the target circuitries in the run operational mode. The power consumption configurations of the target circuitries that are stored in the PS_SLEEP_CFG register 414 include a power consumption configuration of each of the target circuitries in the sleep operational mode. The power consumption configurations of the target circuitries that are stored in the PS_AWAKE_CFG register 416 include a power consumption configuration of each of the target circuitries in the awake operational mode. In other words, for each of the target circuitries, one power consumption configuration in each of the three operational modes is stored in the PS_RUN_CFG register, the PS_SLEEP_CFG register or the PS_AWAKE_CFG register. As a result, the system of FIG. 4 allows the user to control operations of each of the target circuitries in all of the three operational modes. For example, for an SoC with eight target circuitries, the PS_RUN_CFG register stores a power consumption configuration of each of the eight target circuitries in the run operational mode, the PS_SLEEP_CFG register stores a power consumption configuration of each of the eight target circuitries in the sleep operational mode and the PS_AWAKE_CFG register stores the power consumption configuration of each of the eight target circuitries in the awake operational mode. Thus, the SoC operational mode controller circuit 402 allows the user to pick the exact power configurations of the target circuitries in the SoC in the three operational modes to achieve a desirable behavior.

The power consumption configuration of a target circuitry 404, 406 in an operational mode includes information about the power consumption of the target circuitry in the operational mode. For example, the power consumption configuration of the target circuitry in the operational mode includes a power down signal that can be used to shut down the target circuitry to conserve energy or a power up signal that can be used to wake up the target circuitry if the target circuitry is shut down. Additionally, the power consumption configuration of the target circuitry in the operational mode may be in the form of at least one signal, at least one digital signal such as a single bit, multiple bits, a single digital symbol or multiple digital symbols.

The SoC operational mode determiner circuit 418 is configured to determine an operational mode for the SoC 400 from the three operational modes. In an embodiment, the SoC operational mode determiner circuit processes a request to switch the SoC from operating in a first operational mode to operating in a second operational mode, verifies whether a current operational mode of the SoC is the first operational mode and determines a next operational mode of the SoC to be the second operational mode using at least one processor. Although the SoC operational mode determiner circuit is shown in FIG. 4 as being separate from other components of the SoC operational mode controller circuit 402, the SoC operational mode determiner circuit may be integrated with the other components of the SoC operational mode controller circuit in other embodiments. For example, the SoC operational mode determiner circuit is integrated with the PS loader circuit 420.

The PS loader circuit 420 is configured to automatically load the power consumption configurations of the target circuitries 404, 406 in the SoC 400 for the operational mode that is determined by the SoC operational mode determiner circuit 418, which is stored in the PS_RUN_CFG register 412, the PS_SLEEP_CFG register 414 or the PS_AWAKE_CFG register 416, into the PS_CONTROL register 422.

The PS_CONTROL register 422 is configured to store the power consumption configurations of the target circuitries 404, 406 in the SoC 400 in the determined operational mode that are automatically loaded into the PS_CONTROL register by the PS loader circuit 420. In an embodiment, the PS_CONTROL register is further configured to control the operations of the target circuitries according to the power consumption configurations that are automatically loaded into the PS_CONTROL register.

In an embodiment, the SoC operational mode determiner circuit 418 determines the sleep operational mode as the next operational mode of the SoC 400 and the PS loader circuit 420 synchronously loads the power consumption configurations of the target circuitries 404, 406 in the sleep operational mode that is stored in the PS_SLEEP_CFG register 414 into the PS_CONTROL register 422 to control the target circuitries. For example, the system clock circuit 408 is running when the SoC switches from operating in the run operational mode to operating in the sleep operational mode and the PS loader loads the power consumption configurations of the target circuitries for the sleep operational mode that is stored in the PS_SLEEP_CFG register into the PS_CONTROL register during a clock edge of the system clock circuit.

In an embodiment, the SoC operational mode determiner circuit 418 determines the awake operational mode as the next operational mode of the SoC 400 and the PS loader circuit 420 asynchronously loads the power consumption configurations of the target circuitries 404, 406 for the awake operational mode that is stored in the PS_AWAKE_CFG register 416 into the PS_CONTROL register 422 to control the target circuitries. For example, the system clock circuit 408 may not be running when the SoC switches from operating in the sleep operational mode to operating in the awake operational mode and the PS loader circuit loads the power consumption configurations of the target circuitries in the awake operational mode that is stored in the PS_AWAKE_CFG register into the PS_CONTROL register without a clock signal from the system clock circuit.

In an embodiment, the SoC operational mode determiner circuit 418 determines the run operational mode as the operational mode of the SoC 400 and the PS loader circuit 420 synchronously loads the power consumption configurations of the target circuitries 404, 406 in the run operational mode that is stored in the PS_RUN_CFG register 412 into the PS_CONTROL register 422. For example, the system clock circuit 408 is running when the SoC switches from operating in the awake operational mode to operating in the run operational mode and the PS loader circuit loads the power consumption configurations of the target circuitries for the run operational mode that is stored in the PS_RUN_CFG register into the PS_CONTROL register during a clock edge of the system clock circuit.

Figure 5:
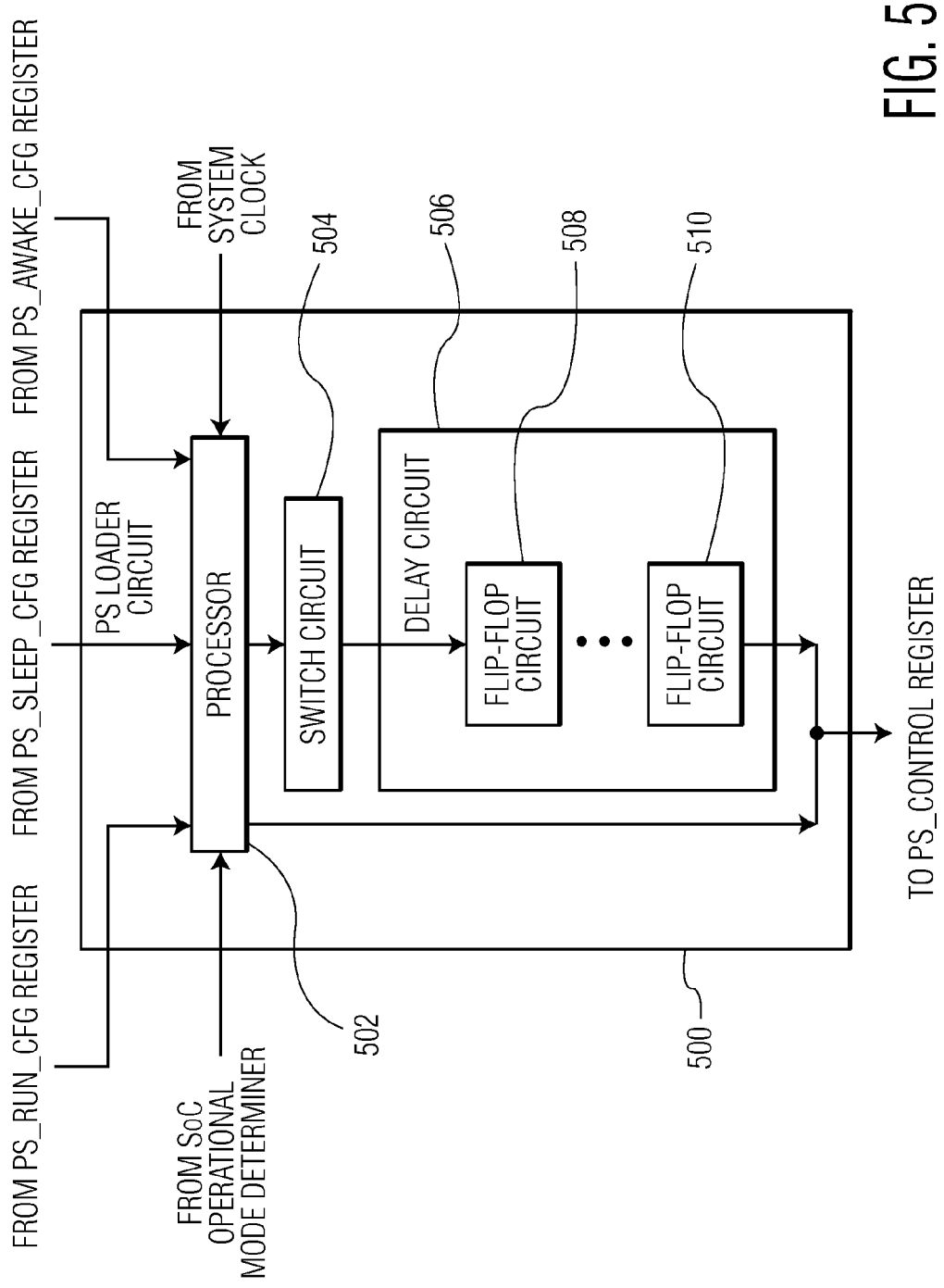
FIG. 5 depicts an exemplary embodiment of an SoC power state loader circuit of FIG. 4.

A sudden power up or power down of an analog circuitry may cause problems for the SoC 400. For example, if the system clock circuit 408 shuts down immediately after a rising clock edge of the system clock circuit is outputted, a glitch will be propagated around the SoC and hence will corrupt the digital logic of the SoC. In another example, if an analog circuitry shuts down and then awakes after a short period of time while a part of the analog circuitry is still being shut down, the analog circuitry may be damaged and the SoC may become unstable. FIG. 5 depicts an exemplary embodiment of the PS loader circuit 420 of FIG. 4. When at least one analog circuitry is being shut down, the PS loader circuit 500 of FIG. 5 delays a wake-up request of the analog circuitry for a duration of time, for example 30 nanoseconds, to ensure the analog circuitry is being cleanly shut down before being awoken. As shown in FIG. 5, the PS loader circuit includes a processor 502, a switch circuit 504 and a delay circuit 506. In some embodiments, the PS loader circuit of FIG. 5 is used to delays a wake-up request of at least one digital circuitry.

In the embodiment of FIG. 5, the processor 502 automatically loads the power consumption configurations of target analog circuitries in the SoC 400 for the operational mode that is determined by the SoC operational mode determiner circuit 418, which is stored in the PS_RUN_CFG register 412, the PS_SLEEP_CFG register 414 or the PS_AWAKE_CFG register 416, into the PS_CONTROL register 422 through the switch circuit 504.

The switch circuit 504 is configured switch on or switch off the delay circuit 506. By default, the switch circuit turns off the delay circuit. In other words, the delay circuit is inactive by default.

The delay circuit 506 includes at least two serially connected flip-flop circuits 508, 510. The delay circuit is configured to create a rising clock edge even after all of the system clocks of the SoC 400 have been shut down. Thus, the delay circuit ensures that the system clocks of the SoC shut down after a falling edge and thus ensures that there is no glitch in the SoC. Once system clocks that set to be shut down are shut down, the delay circuit is turned on by the switch circuit 504. Once the last flip-flop circuit 510 of the delay circuit is toggled, the analog circuitry that has been cleanly shut down can be awoken.

A power consumption configuration of a target circuitry in an operational mode may include a power state signal, which represents a desired power state of the target circuitry in the operational mode that is chosen by the user or set by default. For example, the power state of the target circuitry in the operational mode includes a power-up state and a power-down state and is represented by a single bit. The power consumption of the target circuitry in the power-up state is higher than the power consumption of the target circuitry in the power-down state. In the power-up state, the target circuitry is "on" or operating and the power consumption of the target circuitry is relatively high. In the power-down state, the target circuitry is "off" or shut down to conserve energy and the power consumption of the target circuitry is relatively low. In an embodiment, the power consumption of the target circuitry in the power-down state is zero.

FIGS. 6-9 depict exemplary embodiments of the PS_CONTROL register 422, the PS_RUN_CFG register 412, the PS_SLEEP_CFG register 414 and the PS_AWAKE_CFG 416 register of FIG. 4, respectively.

Figure 6:
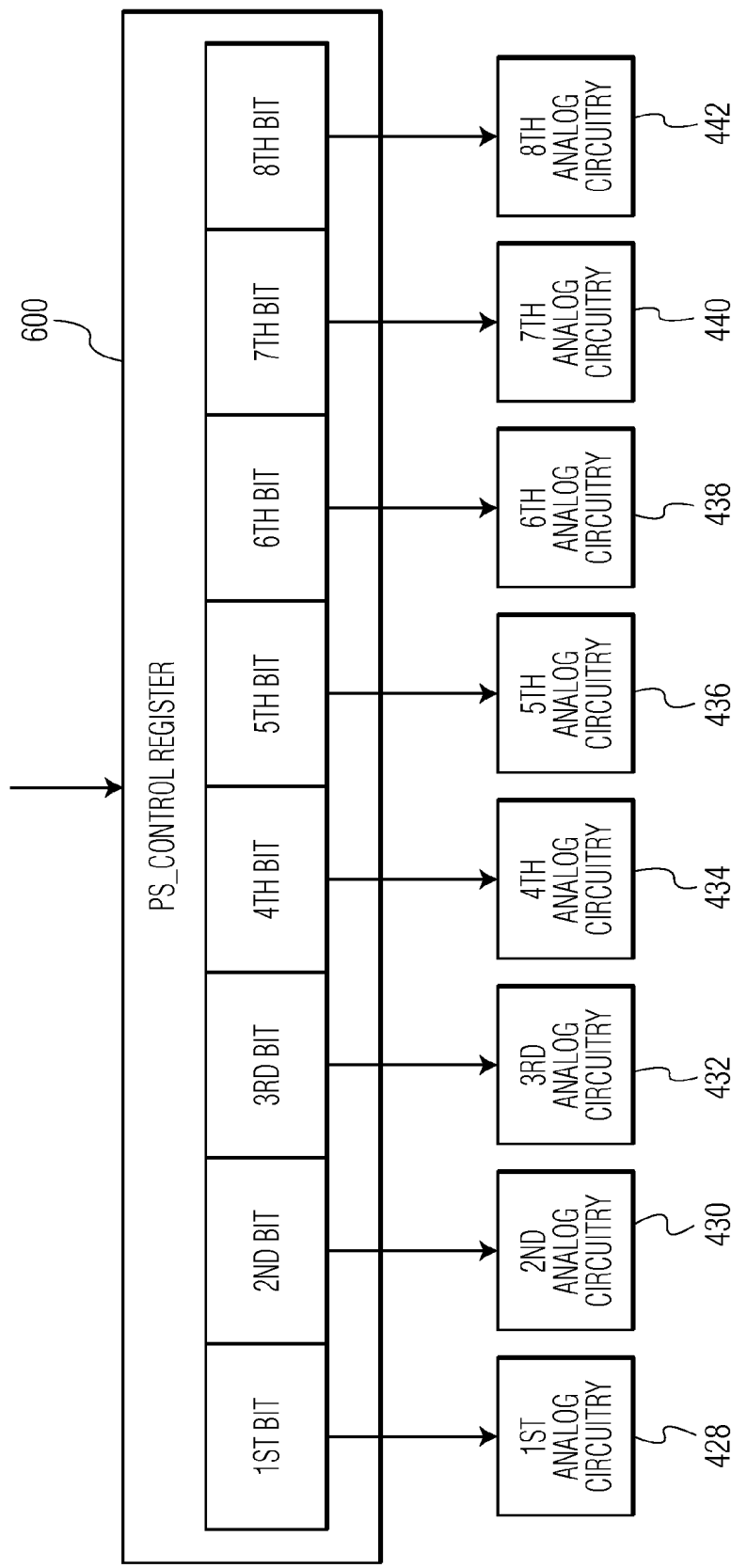
FIG. 6 depicts an exemplary embodiment of an SoC power state control register of FIG. 4.

In the embodiment of FIG. 6, the target circuitries 404, 406 of the SoC 400 includes eight target analog circuitries 428, 430, 432, 434, 436, 438, 440, 442, and the PS_CONTROL register 600 includes eight power state bits, where each of the eight power states bits controls a corresponding target analog circuitry of the eight target analog circuitries.

Figure 7:
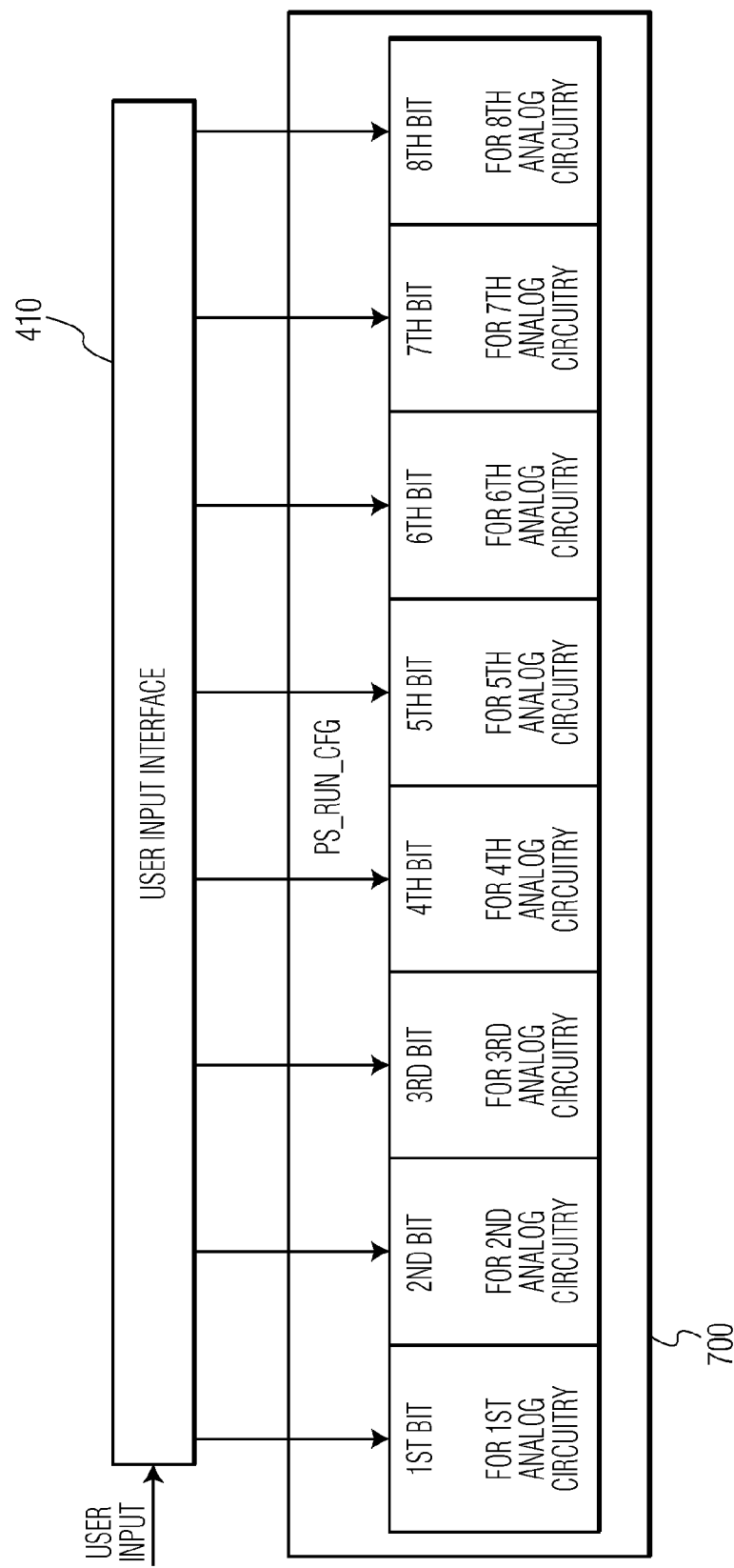
FIG. 7 depicts an exemplary embodiment of a power state configuration register for a run operational mode of FIG. 4.

In the embodiment of FIG. 7, the PS_RUN_CFG register 700 includes eight power state bits, where each of the eight power states bits is programmed by the user through the user input interface and represents a desired power state of a corresponding target analog circuitry of the eight target analog circuitries in the run operational mode.

Figure 8:
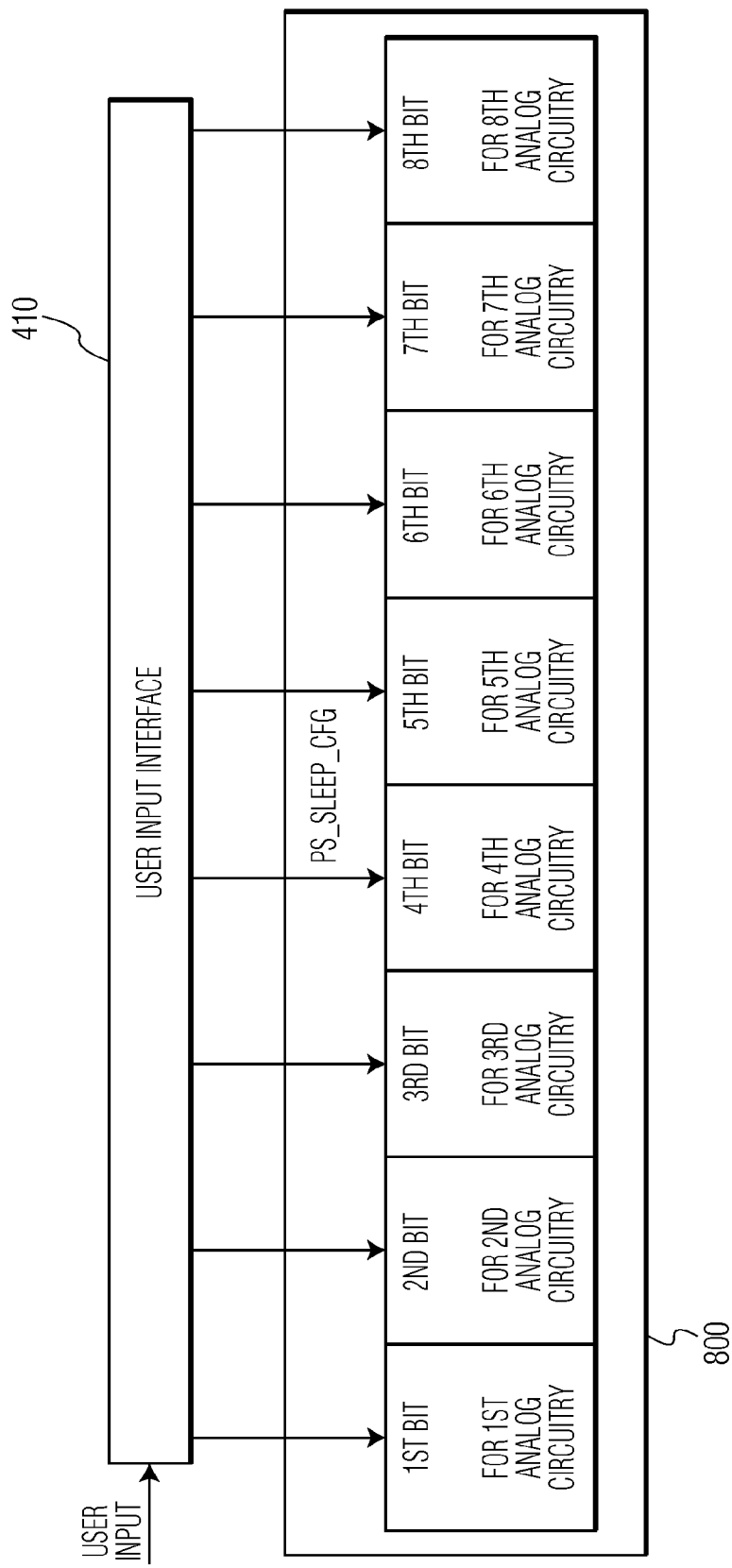
FIG. 8 depicts an exemplary embodiment of a power state configuration register for a sleep operational mode of FIG. 4.

In the embodiment of FIG. 8, the PS_SLEEP_CFG register 800 includes eight power state bits, where each of the eight power states bits is programmed by the user through the user input interface and represents a desired power state of a corresponding target analog circuitry of the eight target analog circuitries in the sleep operational mode.

Figure 9:
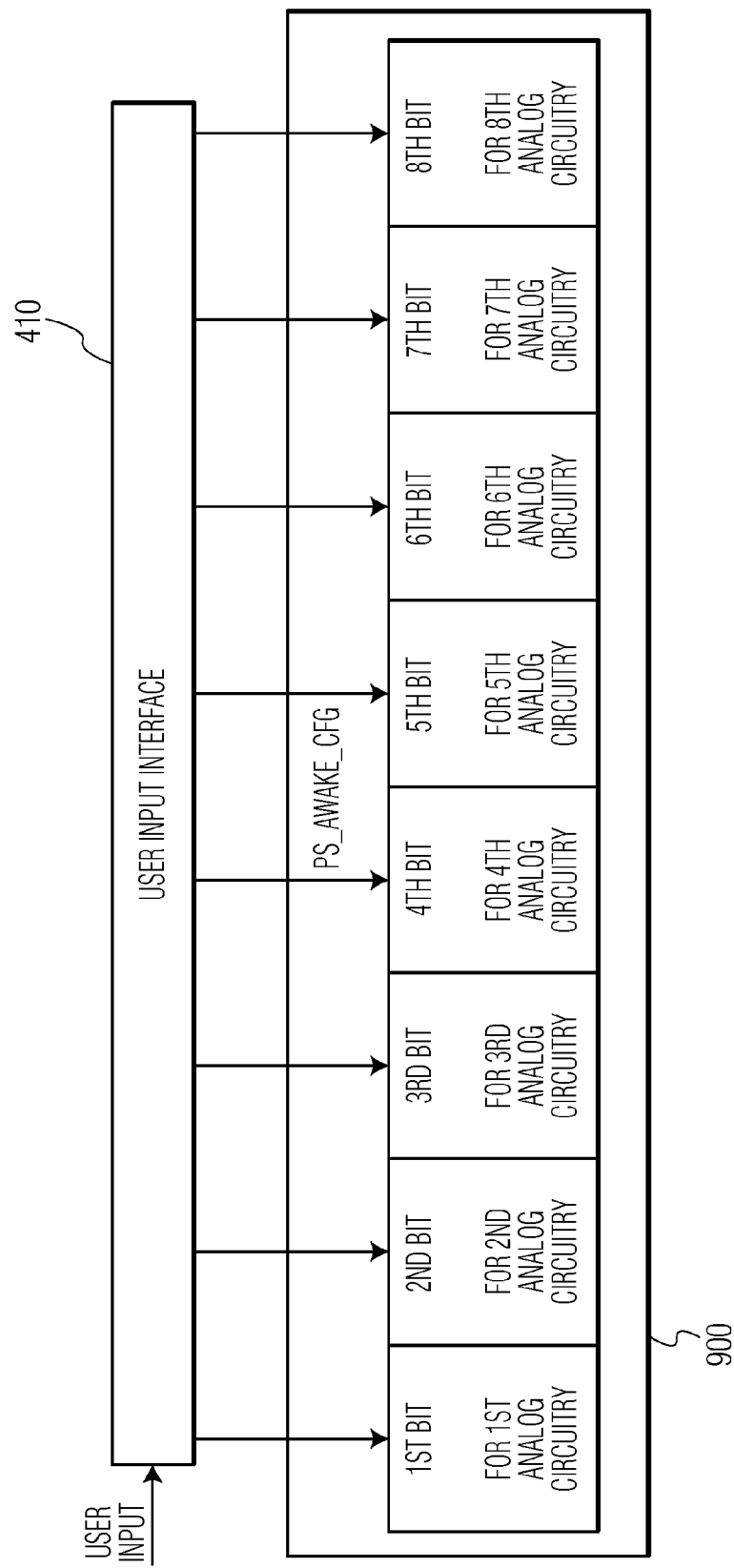
FIG. 9 depicts an exemplary embodiment of a power state configuration register for an awake operational mode of FIG. 4.

In the embodiment of FIG. 9, the PS_AWAKE_CFG register 900 includes eight power state bits, where each of the eight power states bits is programmed by the user through the user input interface and represents a desired power state of a corresponding target analog circuitry of the eight target analog circuitries in the awake operational mode.

In an exemplary operation of the SoC of FIGS. 4-9, a user controls operations of the eight target analog circuitries 428, 430, 432, 434, 436, 438, 440, 442.

Firstly, the user programs the eight power state bits of the PS_RUN_CFG register 700, the eight power state bits of the PS_SLEEP_CFG register 800 and the eight power state bits of the PS_AWAKE_CFG register 900, respectively, through the user input interface 410 according to user desired power state configurations of the eight target analog circuitries 428, 430, 432, 434, 436, 438, 440, 442 for the run operational mode, the sleep operational mode and the awake operational mode, respectively.

Then the user sends a sleep request to the SoC operational mode determiner circuit 418 through the user input interface 410 to switch the SoC 400 from operating in the run operational mode to operating in the sleep operational mode. The SoC operational mode determiner circuit processes the sleep request from the user, verifies whether the current operational mode of the SoC is the run operational mode and determines that a next operational mode of the SoC is the sleep operational mode if the current operational mode of the SoC is verified to be the run operational mode. The PS loader circuit 500 automatically loads the eight power state bits of the eight target analog circuitries 428, 430, 432, 434, 436, 438, 440, 442 for the sleep operational mode, which is stored in the PS_SLEEP_CFG register 800, into the PS_CONTROL register 600. The PS_CONTROL register outputs the eight power state bits of the eight target analog circuitries for the sleep operational mode, which are automatically loaded into the PS_CONTROL register by the PS loader circuit, to the eight target analog circuitries. Each of the eight target analog circuitries compares the user desired power state of the analog circuitry for the sleep operational mode, which is represented by the power state bit corresponding to the analog circuitry, with the current power state of the analog circuitry and adjusts to the user desired power state if the current power state is different from the user desired power state.

Then the user sends an awake request to the SoC operational mode determiner circuit 418 through the user input interface 410 to switch the SoC 400 from operating in the sleep operational mode to operating in the awake operational mode. The SoC operational mode determiner circuit processes the awake request from the user, verifies whether the current operational mode of the SoC is the sleep operational mode and determines that a next operational mode of the SoC is the awake operational mode if the current operational mode of the SoC is verified to be the sleep operational mode. The PS loader circuit 500 automatically loads the eight power state bits of the eight target analog circuitries 428, 430, 432, 434, 436, 438, 440, 442 for the awake operational mode, which is stored in the PS_AWAKE_CFG register 900, into the PS_CONTROL register 600. However, if the awake request from the user arrives right after the sleep request from the user, the PS loader circuit uses the delay circuit 506 to delay the awake request for a duration of time to ensure the target analog circuitries are being cleanly shut down before being awoken. The PS_CONTROL register outputs the eight power state bits of the eight target analog circuitries for the awake operational mode, which are automatically loaded into the PS_CONTROL register by the PS loader circuit, to the eight target analog circuitries. Each of the eight target analog circuitries compares the user desired power state of the analog circuitry for the awake operational mode, which is represented by the power state bit corresponding to the analog circuitry, with the current power state of the analog circuitry and adjusts to the user desired power state if the current power state is different from the user desired power state.

Then the user sends a run request to the SoC operational mode determiner circuit 418 through the user input interface to switch the SoC 400 from operating in the awake operational mode to operating in the run operational mode. The SoC operational mode determiner circuit processes the run request from the user, verifies whether the current operational mode of the SoC is the awake operational mode and determines that a next operational mode of the SoC is the run operational mode if the current operational mode of the SoC is verified to be the awake operational mode. The PS loader circuit 500 automatically loads the eight power state bits of the eight target analog circuitries 428, 430, 432, 434, 436, 438, 440, 442 for the run operational mode, which is stored in the PS_RUN_CFG register 700, into the PS_CONTROL register 600. The PS_CONTROL register outputs the eight power state bits of the eight target analog circuitries for the run operational mode, which are automatically loaded into the PS_CONTROL register by the PS loader circuit, to the eight target analog circuitries. Each of the eight target analog circuitries compares the user desired power state of the analog circuitry for the run operational mode, which is represented by the power state bit corresponding to the analog circuitry, with the current power state of the analog circuitry and adjusts to the user desired power state if the current power state is different from the user desired power state.

When the SoC 400 is operating in the run operational mode, the user may reprogram the eight power state bits of the PS_RUN_CFG register 700 and send a reconfiguration request to the SoC operational mode determiner 418. The SoC operational mode determiner circuit processes the reconfiguration request from the user and identifies that the current operational mode is the run operational mode. Then the PS loader circuit 500 automatically loads eight power state bits of the eight target analog circuitries 428, 430, 432, 434, 436, 438, 440, 442 for the run operational mode, which are reconfigured by the user and stored in the PS_RUN_CFG register 700, into the PS_CONTROL register 600. The PS_CONTROL register outputs the eight power state bits of the eight target analog circuitries for the run operational mode, which are reconfigured by the user and automatically loaded into the PS_CONTROL register by the PS loader circuit, to the eight target analog circuitries. Each of the eight target analog circuitries compares the user desired power state of the analog circuitry for the run operational mode, which is represented by the power state bit corresponding to the analog circuitry, with the current power state of the analog circuitry and adjusts to the user desired power state if the current power state is different from the user desired power state.

Figure 10:
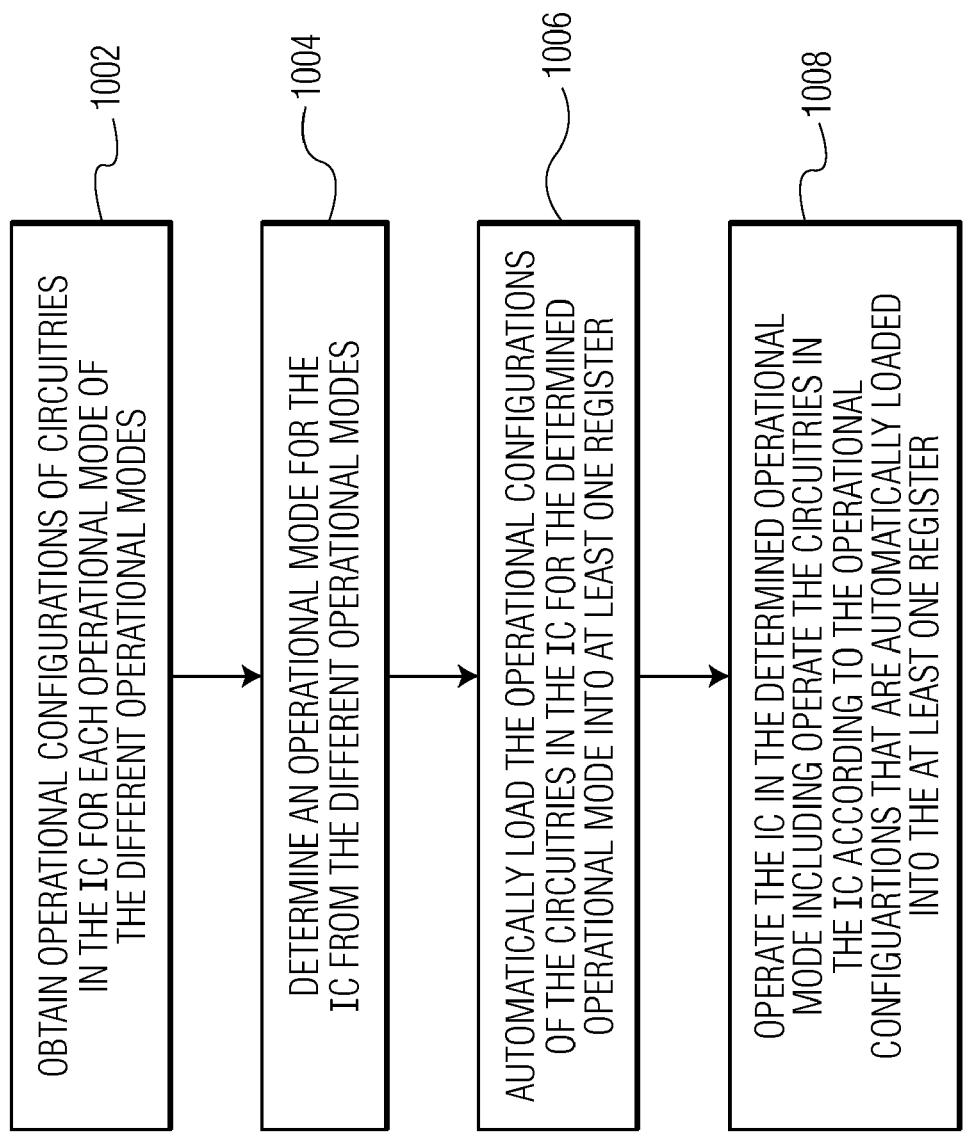
FIG. 10 is a process flow diagram of a method for controlling an IC in different operational modes in accordance with an embodiment of the invention.

FIG. 10 is a process flow diagram of a method for controlling an IC in different operational modes in accordance with an embodiment of the invention. At block 1002, operational configurations of circuitries in the IC for each operational mode of the different operational modes are obtained. At block 1004, an operational mode for the IC is determined from the different operational modes. At block 1006, the operational configurations of the circuitries in the IC for the determined operational mode are automatically loaded into at least one register. At block 1008, the IC is operated in the determined operational mode, where the circuitries in the IC are operated according to the operational configurations that are automatically loaded into the at least one register.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention that have been described or depicted include several components described or depicted herein, other embodiments of the invention may include fewer or more components to implement less or more functionality.

Although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for controlling an integrated circuit (IC) in different operational modes, the method comprising:
    obtaining operational configurations of circuitries in the IC for each operational mode of the different operational modes;
    determining an operational mode for the IC from the different operational modes;
    automatically loading the operational configurations of the circuitries in the IC for the determined operational mode into at least one register; and
    operating the IC in the determined operational mode, including operating the circuitries in the IC according to the operational configurations that are automatically loaded into the at least one register.

2. The method of claim 1, wherein the at least one register consists of a single register.

3. The method of claim 2, wherein the different operational modes consists of a run operational mode, a sleep operational mode and an awake operational mode.

4. The method of claim 2, wherein the operational configurations of the circuitries in the IC comprises power consumption configurations of the circuitries in the IC.

5. The method of claim 2, wherein the obtaining comprises obtaining an operational configuration of each circuitry of the circuitries in the IC for each operational mode of the different operational modes, wherein the automatically loading comprises automatically loading the operational configuration of each circuitry of the circuitries in the IC for the determined operational mode into the single register and wherein the operating the circuitries in the IC comprises operating each circuitry of the circuitries in the IC according to the operational configuration of the circuitry that is automatically loaded into the single register.

6. The method of claim 3, wherein the determining comprises:
    processing a request to switch the IC from operating in a first operational mode to operating in a second operational mode;
    verifying whether a current operational mode of the IC is the first operational mode; and
    determining a next operational mode of the IC to be the second operational mode,
    wherein the first operational mode and the second operational mode are the run operational mode and the sleep operational mode, respectively, or the first operational mode and the second operational mode are the sleep operational mode and the awake operational mode, respectively, or the first operational mode and the second operational mode are the awake operational mode and the run operational mode, respectively.

7. The method of claim 6, wherein the automatically loading comprises automatically loading the operational configurations of the circuitries in the IC for the next operational mode into the single register, and wherein the operating the circuitries in the IC comprises operating the circuitries in the IC according to the operational configurations for the next operational mode that are automatically loaded into the single register.

8. The method of claim 3, wherein the automatically loading comprises:
    synchronously loading the operational configurations of the circuitries in the IC for the run operational mode into the single register;
    asynchronously loading the operational configurations of the circuitries in the IC for the sleep operational mode into the single register; and
    synchronously loading the operational configurations of the circuitries in the IC for the awake operational mode into the single register.

9. The method of claim 3 further comprising:
    obtaining new operational configurations of the circuitries in the IC for the run operational mode;
    automatically loading the new operational configurations of the circuitries in the IC for the run operational mode into the single register; and
    operating the circuitries in the IC according to the new operational configurations that are automatically loaded into the single register.

10. A system for controlling an integrated circuit (IC) in different operational modes, the system comprising:
    an IC operational configuration obtainer circuit configured to obtain operational configurations of circuitries in the IC for each operational mode of the different operational modes;
    an IC operational mode determiner circuit configured to determine an operational mode for the IC from the different operational modes;
    at least one IC operational configuration register; and
    an IC operational configuration loader circuit configured to automatically load the operational configurations of the circuitries in the IC for the determined operational mode into the at least one IC operational configuration register, wherein the at least one IC operational configuration register controls the circuitries in the IC to operate according to the operational configurations that are automatically loaded into the at least one IC operational configuration register.

11. The system of claim 10, wherein the at least one IC operational configuration register consists of a single register and wherein the different operational modes consists of a run operational mode, a sleep operational mode and an awake operational mode.

12. The system of claim 11, wherein the IC operational configuration obtainer circuit is further configured to obtain a power consumption configuration of each circuitry of the circuitries in the IC for each operational mode of the different operational modes, wherein the IC operational configuration loader circuit is further configured to automatically load the power consumption configuration of each circuitry of the circuitries in the IC for the determined operational mode into the at least one IC operational configuration register, wherein each circuitry of the circuitries in the IC operates according to the power configuration of the circuitry for the determined operational mode that is automatically loaded into the single register.

13. The system of claim 12, wherein the IC operational configuration loader circuit is further configured to synchronously load the operational configurations of the circuitries in the IC for the run operational mode into the single register, to asynchronously load the operational configurations of the circuitries in the IC for the sleep operational mode into the single register and to synchronously load the operational configurations of the circuitries in the IC for the awake operational mode into the single register.

14. A system on chip (SoC) operating in different operational modes, the SoC comprising
circuitries; and
an SoC operational mode controller circuit comprising:
an SoC operational configuration obtainer circuit configured to obtain operational configurations of the circuitries for each operational mode of the different operational modes;
an SoC operational mode determiner circuit configured to determine an operational mode for the SoC from the different operational modes;
at least one SoC operational configuration register; and
an SoC operational configuration loader circuit configured to automatically load the operational configurations of the circuitries for the determined operational mode into the at least one SoC operational configuration register,
wherein the at least one SoC operational configuration register controls the circuitries to operate according to the operational configurations that are automatically loaded into the at least one SoC operational configuration register.

15. The SoC of claim 14, wherein the at least one SoC operational configuration register consists of a single register and wherein the different operational modes consists of a run operational mode, a sleep operational mode and an awake operational mode.

16. The SoC of claim 15, wherein the circuitries comprises an analog circuitry and/or a digital circuitry.

17. The SoC of claim 15, wherein the circuitries comprises a system clock circuit.

18. The SoC of claim 15, wherein the SoC operational configuration obtainer circuit comprises:
a run operational mode register configured to store a power consumption configuration of each circuitry of the circuitries for the run operational mode;
a sleep operational mode register configured to store a power consumption configuration of each circuitry of the circuitries for the sleep operational mode; and
an awake operational mode register configured to store a power consumption configuration of each circuitry of the circuitries for the awake operational mode.

19. The SoC of claim 15, wherein the SoC operational configuration loader circuit is further configured to synchronously load the operational configurations of the circuitries for the run operational mode into the single register, to asynchronously load the operational configurations of the circuitries for the sleep operational mode into the single register and to synchronously load the operational configurations of the circuitries for the awake operational mode into the single register.

20. The SoC of claim 15, wherein the SoC operational configuration loader circuit comprises:
a delay circuit comprising serially connected flip-flop circuits;
a switch circuit configured to switch on or switch off the delay circuit; and
a processor configured to automatically load the operational configurations of the circuitries for the determined operational mode into the single register through the switch circuit.

* * * * *